(12) United States Patent
Iftime et al.

(10) Patent No.: US 10,995,240 B2
(45) Date of Patent: May 4, 2021

(54) ALL-IN-ONE FAST CURING ACRYLIC STRUCTURAL ADHESIVE

(71) Applicant: PALO ALTO RESEARCH CENTER INCORPORATED, Palo Alto, CA (US)

(72) Inventors: Gabriel Iftime, Dublin, CA (US); Jessica Louis Baker Rivest, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 181 days.

(21) Appl. No.: 16/040,988

(22) Filed: Jul. 20, 2018

(65) Prior Publication Data

US 2020/0024485 A1    Jan. 23, 2020

(51) Int. Cl.
*C09J 4/00* (2006.01)
*C09J 133/10* (2006.01)
*C09J 5/00* (2006.01)

(52) U.S. Cl.
CPC . *C09J 4/00* (2013.01); *C09J 5/00* (2013.01); *C09J 133/10* (2013.01); *C09J 2433/00* (2013.01)

(58) Field of Classification Search
CPC ... C09J 4/00; C09J 2433/00; C09J 5/00; C09J 133/10
See application file for complete search history.

(56) References Cited

U.S. PATENT DOCUMENTS

| 4,126,504 | A | 11/1978 | Wolinski et al. |
| 5,684,102 | A | 11/1997 | Pocius et al. |
| 2007/0246245 | A1 | 10/2007 | Ahn et al. |
| 2013/0267670 | A1* | 10/2013 | Xie ......................... C09J 133/14 526/198 |

FOREIGN PATENT DOCUMENTS

| EP | 3124517 A1 | 2/2017 |
| WO | 2008085234 A1 | 7/2008 |
| WO | WO 2008/085234 A1 * | 7/2008 |

* cited by examiner

*Primary Examiner* — Robert D Harlan
(74) *Attorney, Agent, or Firm* — Miller Nash Graham & Dunn LLP

(57) ABSTRACT

An acrylic adhesive composition includes a first part including an aminoborane initiator and acrylate or/and methacrylate monomers, and a second part including inert microcapsules of a cure activator and acrylate monomers, wherein the microcapsules are breakable, such that when broken, the first part reacts with the second part and the acrylic adhesive begins to cure. A two-part structural adhesive includes a suspension component containing an aminoborane initiator, and microcapsules containing an encapsulated component, wherein the microcapsules are dispersed in the suspension component. A method of activating an aminoborane initiator suspension to form a structural adhesive includes adding microcapsules containing an encapsulated component, to the aminoborane initiator suspension at a predetermined ratio, and breaking the microcapsules to activate curing.

14 Claims, 1 Drawing Sheet

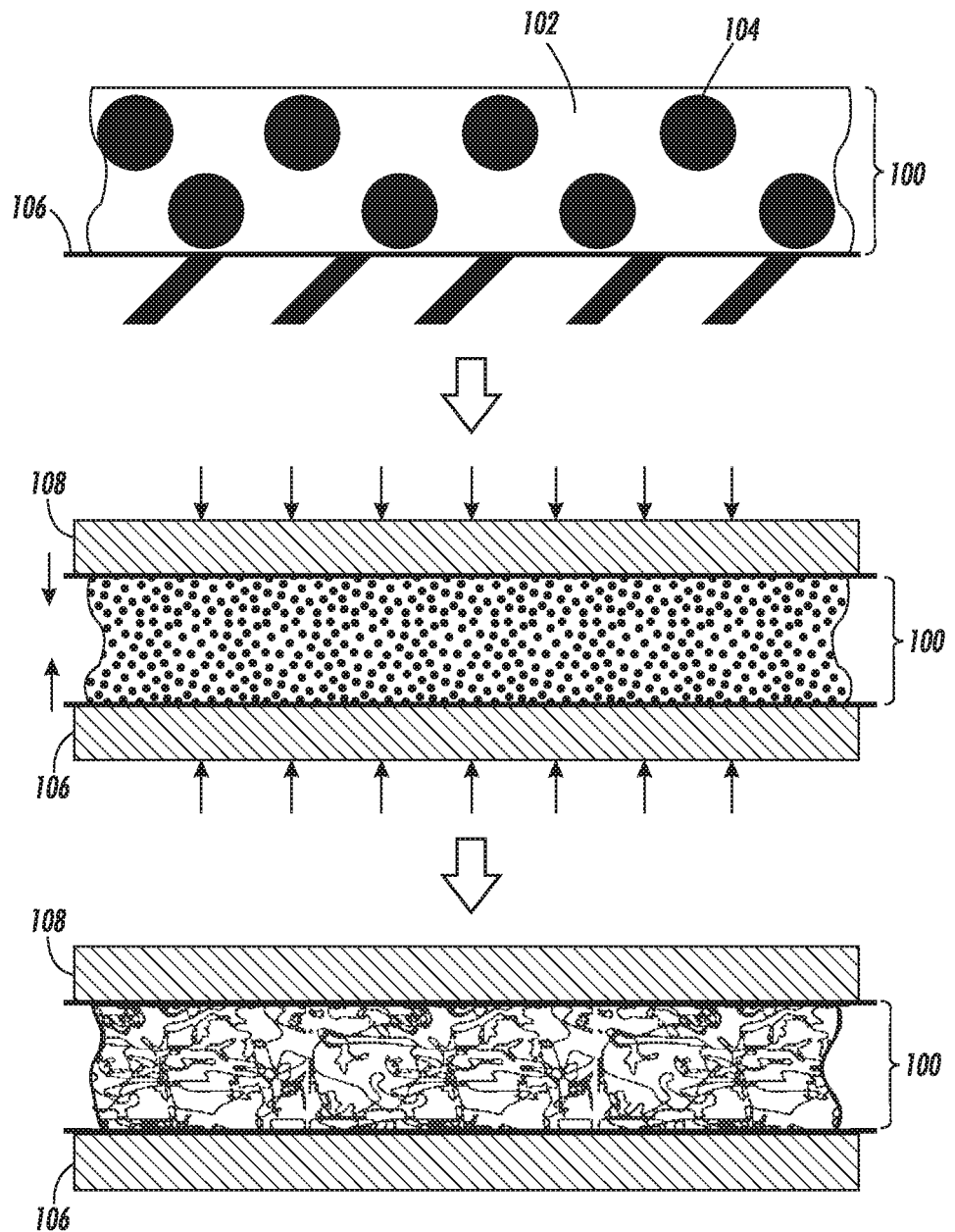

ALL-IN-ONE FAST CURING ACRYLIC STRUCTURAL ADHESIVE

TECHNICAL FIELD

The disclosed technology relates generally to the field of adhesives and, more particularly, to acrylic adhesives with inert microcapsules.

BACKGROUND

Structural adhesives have been widely used to replace traditional mechanical attachment techniques such as welds, rivets, screws, spot welds, and bolts, for example. For most industrial bonding applications, two-part epoxy and acrylic structural adhesives are used. Acrylic adhesives are preferred over epoxy adhesives in applications requiring no surface preparation due to their faster curing speeds at room temperature and their ability to bond common plastics, such as polypropylene, polyethylene, or polystyrene, with each other as well as with dissimilar materials. However, the limited worklife of acrylic adhesives has prevented their introduction in high speed assembly lanes, such as those found in the automotive and the packaging industries. Application equipment of conventional liquid acrylic adhesives must be cleaned thoroughly and often to prevent adhesive residue from hardening. Using conventional acrylic adhesives with robotic adhesive dispensing equipment has not been possible because residual cured adhesive would plug the feeding lines and nozzles in minutes.

In general, conventional adhesives may include epoxy adhesives, encapsulated adhesives, and others. Two-part adhesives typically include separate resin and hardener components, where the chemical reaction between the two parts causes cross-linking. For example, some peroxide-initiated adhesives include two parts separately encapsulated within the same suspension that cure when the two parts react after being released from the capsules. However, these types of adhesives with peroxide initiation can be slow to cure and prone to premature curing through heat activation, thus limiting their shelf life.

Therefore, a fast curing acrylic structural adhesive that can be deposited with fast robotic or automatic dispensing equipment is needed.

SUMMARY

According to an aspect illustrated here, there is provided an acrylic adhesive composition having a first part including an aminoborane initiator and acrylate or/and methacrylate monomers, and a second part including inert microcapsules of a cure activator and acrylate monomers, wherein the microcapsules are breakable, such that when broken, the first part reacts with the second part and the acrylic adhesive begins to cure.

According to another aspect illustrated here, there is provided two-part structural adhesive having a suspension component containing an aminoborane initiator, and microcapsules containing an encapsulated component, wherein the microcapsules are dispersed in the suspension component.

According to another aspect illustrated here, there is provide a method of A method of activating an aminoborane initiator suspension to form a structural adhesive, including adding microcapsules containing an encapsulated component, to the aminoborane initiator suspension at a predetermined ratio, and breaking the microcapsules to activate curing.

BRIEF DESCRIPTION OF THE DRAWINGS

FIG. 1 shows cross-sectional views of an example two-part structural adhesive composition, including microcapsules in a suspension medium, as the adhesive cures, in accordance with certain embodiments of the disclosed technology.

DETAILED DESCRIPTION OF THE EMBODIMENTS

Disclosed herein are systems and methods of making and using a two-part or "all-in-one" acrylic structural adhesive. The structural adhesive composition may be fast-curing for use in commercial environments, such as high speed industrial assembly lines, for example. The two-part adhesive composition may include a first part including an aminoborane initiator, optional acrylate or methacrylate monomers and additional additives such as tougheners. The two-part adhesive composition may include a second part that is encapsulated within inert microcapsules. The encapsulated second part may include a water insoluble cure activator, such as a carboxylic acid that is optionally dissolved or dispersed within acrylate and/or methacrylate monomers. The placement of the cure activator inside microcapsules allows premixing these inert microcapsules within the first part that contains the aminoborane initiator without being activated because it prevents direct contact between the cure activator and the amino-borane initiator. The curing process is activated when the curing activator and the aminoborane initiator interact with each other. Direct contact can be achieved by high pressure, ultrasonic, or shock waves may cause the microcapsules to rupture, initiating rapid curing by radical polymerization. Curing may be initiated immediately following microcapsule rupture, with cure times variable depending on microcapsule to suspension ratios. Further, the breaking point or pressure of the microcapsules may be tailored to the desired application.

The ability to finely control the ratio of cure activating microcapsules to the aminoborane initiator suspension allows for optimizing cure times to less than 1 second, in contrast to the minimum cure time of minutes required by conventional adhesives. The inert encapsulation of the cure activator eliminates the need to immediately clean application equipment after deposition of the structural adhesive. Since the two-part adhesive compositions are inert before application onto substrates, they may be handled indefinitely before deposition and used without premature curing, thus not substantially limited by shelf- or worklife.

As shown in FIG. 1, an all-in-one fast curing acrylic structural adhesive composition 100 may be made up of two parts or components—an encapsulated part 104 with a water insoluble carboxylic acid activator, and a suspension part 102 with an aminoborane initiator. The encapsulated part 104 consists of microcapsules containing the carboxylic acid that may activate curing. The microcapsules 104 may also contain acrylate and/or methacrylate monomers. The encapsulation of the cure activator in microcapsules 104 advantageously allows sufficient handling time for deposition of the structural adhesive. The cure activator within the microcapsules 104 may be a carboxylic acid that is sufficiently water insoluble or hydrophobic with very little miscibility with water. For example, the carboxylic acid may have more than 6 carbon atoms and have less than about 0.1% solubility in water. The suspension part 102 may include an air-stable aminoborane initiator. The suspension part 102 may also contain acrylate monomers. Further, the suspension part 102 may include tougheners or other additives. For example, the viscosity of the suspension part 102 may be altered in various ways, such as by adding thickening agents.

The two-part structural adhesive 100 may be curable at room temperature through breaking the microcapsules 104. The microcapsules 104 may be broken, crushed, and/or ruptured by many means. For example, the microcapsules 104 may be broken by applying pressure to the two-part adhesive composition 100, in which the microcapsules 104 are suspended. FIG. 1 shows the curing through cross-linking of an example two-part structural adhesive following the application of pressure to the composition 100 via the substrates 106 and 108. Curing may be initiated very quickly following microcapsule breakage.

The microcapsules may be dispersed within the first part substantially uniformly. This substantially uniform dispersion may advantageously eliminate any mixing that is required in conventional adhesives. The inherently small and distributed nature of the microcapsules allows for much finer mixing between the two parts of the adhesive composition. For example, in some embodiments, the microcapsules may have a diameter of about 5-20 μm or more. The bonding of the two-part structural adhesive composition 100 may be sensitive to the ratio of the suspension part 102 to the encapsulated part 104. The two parts may be mixed in various concentration ranges such as from 100:1 to 1:100. Finer mixing of the two parts of the adhesive composition may allow for both faster curing and higher uniformity of resultant polymer properties. For example, for higher concentrations of microcapsules 104, which encapsulate the cure activator, cure times may be less than about 1 second. In some embodiments, the ratio of microcapsules 104 to the suspension part 102 may be about 10:1. Higher concentrations are possible. The suspension part 102 may be added to the structural adhesive composition until sufficiently sticky or adhering before activated.

The microcapsules 104 may have a sufficient wall thickness to prevent leakage or accidental breakage. For example, in some embodiments, the microcapsules 104 may have a wall thickness of about 50 nm. In other embodiments, the microcapsules 104 may have a wall thickness of about 3 μm. Additionally, the strength of the microcapsule wall may be optimized to break at a specific pressure. For example, the microcapsule wall strength may be varied by tuning the thickness and material composition. In some embodiments, the microcapsules 104 may break under about 10-15 psi of pressure. In other embodiments, the threshold breaking pressure may be about 100 psi. The pressure needed to break the microcapsules 104 may be scaled as high or low as desired for particular applications.

After the microcapsules 104 are broken such that the internal ingredients are free to interact with the surrounding suspension part 102, the adhesive composition 100 may begin to cure. The curing process for the two-part acrylic structural adhesive 100 may include the activator (R—COOH) reacting with the aminoborane initiator (NHR$_2$) to release borane (BR$_3$). The unstable borane may react with oxygen (O$_2$) in the air, creating radicals (RO.). These radicals may initiate polymerization of the acrylic monomers.

Additionally or alternatively, the encapsulated part 104 with the cure activator may be provided as a separate dry component that can be added to the suspension part 102. In this way, the two parts of the structural adhesive 100 may be stored separately and the encapsulated part 104 may be added to the suspension part 102 prior to use. Further, the two-part adhesive composition 100 may include a certain concentration of microcapsules 104 dispersed in the suspension part 102, where further separate microcapsules 104 may be added to increase the concentration of the encapsulated activator. Increasing the concentration of microcapsules 104 encapsulating the cure activator may substantially shorten the time to cure. Providing smaller, inert microcapsules 104 separately allows for finer control in mixing ratios with the suspension part 102, as well as greater uniformity.

Encapsulation may be achieved through a variety of processes, such as complex coacervation, interfacial polymerization, in-situ polymerization, electrolytic dispersion and cooling, spray-drying processes, and others, for example. The encapsulation process may include complex coacervation, which is ideally suited for encapsulation of organic, more hydrophobic liquids, such as methacrylate monomers compositions that may be included in a liquid resin precursor. The complex coacervation process may produce encapsulated water insoluble materials where the capsule walls consist of gelatin/gum arabic cross-linked with glutaraldehyde. The general process of encapsulation of organic fluids may include preparation of the microcapsules using melamine-formaldehyde, urea-formaldehyde, resorcinol-formaldehyde, phenol-formaldehyde, gelatin-formaldehyde, isocyanate-polyol, interpolymer complexes of two oppositely charged polymers such as gelatin/gum arabic, gelatin-polyphosphate, and poly(styrene sulfonic acid)/gelatin, hydroxypropyl cellulose, mixtures and/or combinations of the foregoing, and the like, as microcapsule wall-forming materials.

EXAMPLES

Example experiments evaluating the suitability of the acrylic materials for encapsulation resulted in the identification of optimized materials. The successful development of the separate encapsulated cure activator and resin system allows for independent optimization of the activator system, in particular for increasing the activator concentration to achieve extremely fast cure (e.g., less than 1 second to handling strength).

The encapsulation process may take place in acidic conditions. As a non-limiting example, the encapsulation process may occur in an environment with a pH value of about 4 and at a temperature of about 40-50° C.

The experimental results revealed that exposing the cure activators of conventional adhesives to the environments of the encapsulation process permanently altered its ability to cure when mixed with the initiators. Without being bound by theory, it is believed that the high aqueous miscibility of the activator material present in Part A of conventional adhesives causes the part to be unrecoverable with the organic material in Part A as it is required by the proposed invention Therefore, because the encapsulated conventional Part A may not contain the activator material, the activation process may not occur and the adhesive composition will not cure.

Similar experiments run with more hydrophobic carboxylic acids as cure activators resulted in very fast cure times (e.g., less than 5 seconds) of the recovered resin part after exposure to the experimental conditions required for encapsulation. Based on the experimental results, the preferred activator materials suitable for fabricating an encapsulated "all-in-one" acrylic adhesive are carboxylic acids with more than 6 carbon atoms and a low solubility in water (e.g., less than 0.1%).

These findings maximized the cure speed of the disclosed two-part adhesives, bringing the cure time down to mere seconds versus the minutes required in conventional acrylate adhesives. Further, the pressure activation eliminates any need for heating to accelerate curing.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A two-part structural adhesive comprising:
   a suspension component containing an aminoborane initiator; and
   inert, breakable microcapsules comprised of interpolymer complexes of two oppositely charged polymers containing an encapsulated component consisting of a hydrophobic carboxylic acid cure activator, wherein the microcapsules are dispersed in the suspension component.

2. The two-part structural adhesive of claim 1, wherein the adhesive is curable at room temperature when the microcapsules are broken.

3. The two-part structural adhesive of claim 2, wherein the microcapsules are breakable under a predetermined pressure.

4. The two-part structural adhesive of claim 1, wherein the microcapsules are dispersed substantially uniformly within the suspension component.

5. The two-part structural adhesive of claim 1, wherein the cure activator includes a carboxylic acid with substantially low aqueous miscibility.

6. The two-part structural adhesive of claim 1, wherein a curing time for the structural adhesive is less than 1 second.

7. The two-part structural adhesive of claim 1, wherein a curing time is less than 5 seconds.

8. The two-part structural adhesive of claim 1, wherein a ratio of the suspension component to the encapsulated component has a range from 100:1 to 100:1.

9. The two-part structural adhesive of claim 1, wherein the inert, breakable microcapsules have a wall thickness of 3 micrometers.

10. The two-part structural adhesive of claim 1, wherein the inert, breakable capsules have a breaking pressure in the range of 10-15 pounds per square inch, inclusive.

11. The two-part structural adhesive of claim 1, wherein the inert, breakable capsules have a breaking pressure of 100 pounds per square inch.

12. The two-part structural adhesive of claim 1, wherein the interpolymer complexes of two oppositely charged polymers comprises one of gelatin/gum arabic, gelatin-polyphosphate, poly(styrene sulfonic acid)/gelatin, hydroxypropyl cellulose, and combinations thereof.

13. The two-part structural adhesive of claim 1, wherein the suspension component includes methacrylate monomers.

14. The two-part structural adhesive of claim 1, wherein the suspension component includes acrylate monomers.

* * * * *